United States Patent
Richter

(10) Patent No.: US 6,470,538 B2
(45) Date of Patent: Oct. 29, 2002

(54) CLAMP RING

(75) Inventor: Peter Richter, Bückeburg (DE)

(73) Assignee: Fr. Jacob Söhne GmbH & Co., Porta Westfalico (DE)

( * ) Notice: Subject to any disclaimer, the term of this patent is extended or adjusted under 35 U.S.C. 154(b) by 0 days.

(21) Appl. No.: 09/855,726

(22) Filed: May 16, 2001

(65) Prior Publication Data

US 2001/0047571 A1 Dec. 6, 2001

(30) Foreign Application Priority Data

May 19, 2000 (DE) .......................... 100 24 834

(51) Int. Cl.⁷ ................................. F16L 23/06
(52) U.S. Cl. ........................................ 24/271
(58) Field of Search ................ 285/409, 410, 285/411, 420; 292/256.5, 256.69; 24/270–273, 19, 285

(56) References Cited

U.S. PATENT DOCUMENTS

| | | |
|---|---|---|
| 2,479,580 A | 8/1949 | Marco |
| 2,659,954 A | 11/1953 | Woosley |
| 3,201,156 A * | 8/1965 | Coats |
| 4,123,095 A * | 10/1978 | Stehlin |
| 4,256,197 A * | 3/1981 | Kiser, Jr. |
| 5,722,666 A * | 3/1998 | Sisk |

FOREIGN PATENT DOCUMENTS

| | | |
|---|---|---|
| AT | 327 632 | 1/1976 |
| DE | 47220 | 7/1889 |
| DE | 950 522 | 11/1956 |
| DE | 19750251 | 6/1999 |

* cited by examiner

Primary Examiner—James R. Brit
(74) Attorney, Agent, or Firm—Barnes & Thorburg

(57) ABSTRACT

A tension ring, particularly for connecting two tube ends, includes several mutually linked segments. A closing device detachably connects two segments with one another. The position of the segments relative to one another is adjustable at least on one hinge element between two segments. As a result of the closing device preferably constructed as a quick-acting closure, a prefixing/pretensioning can be achieved and, subsequently, the tension of the tension ring can be regulated to the desired extent by an adjusting device without opening the closing device again.

14 Claims, 2 Drawing Sheets

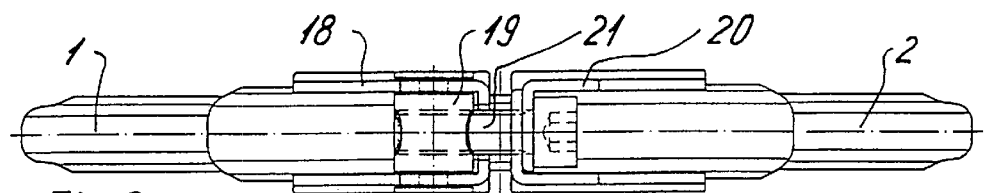
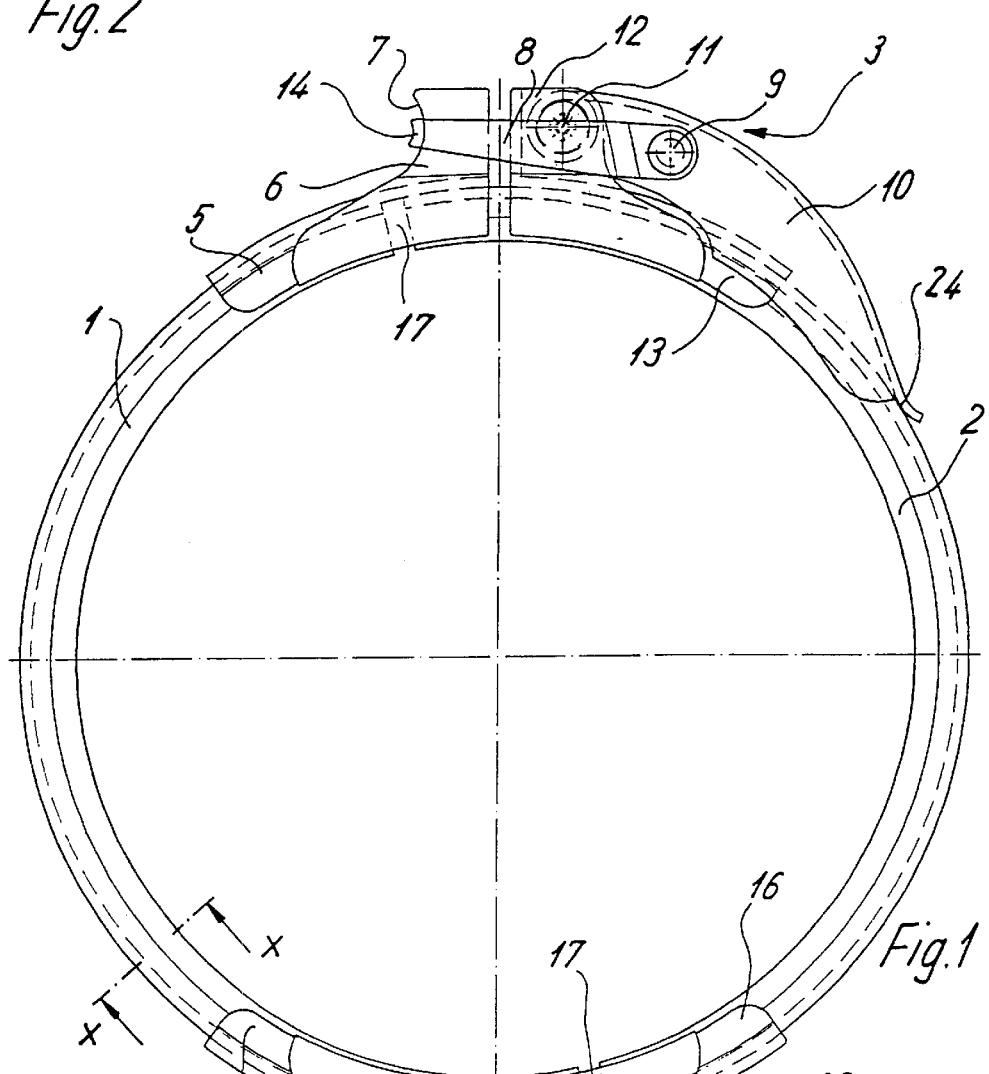
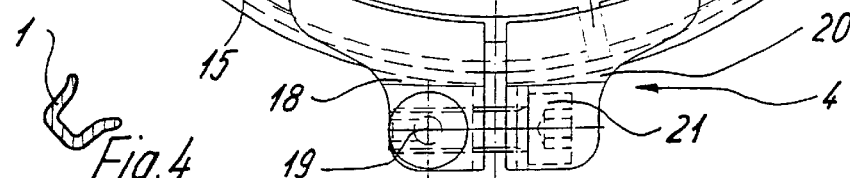
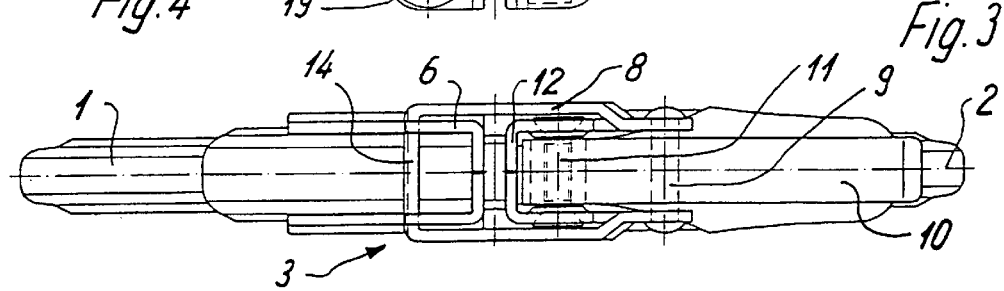

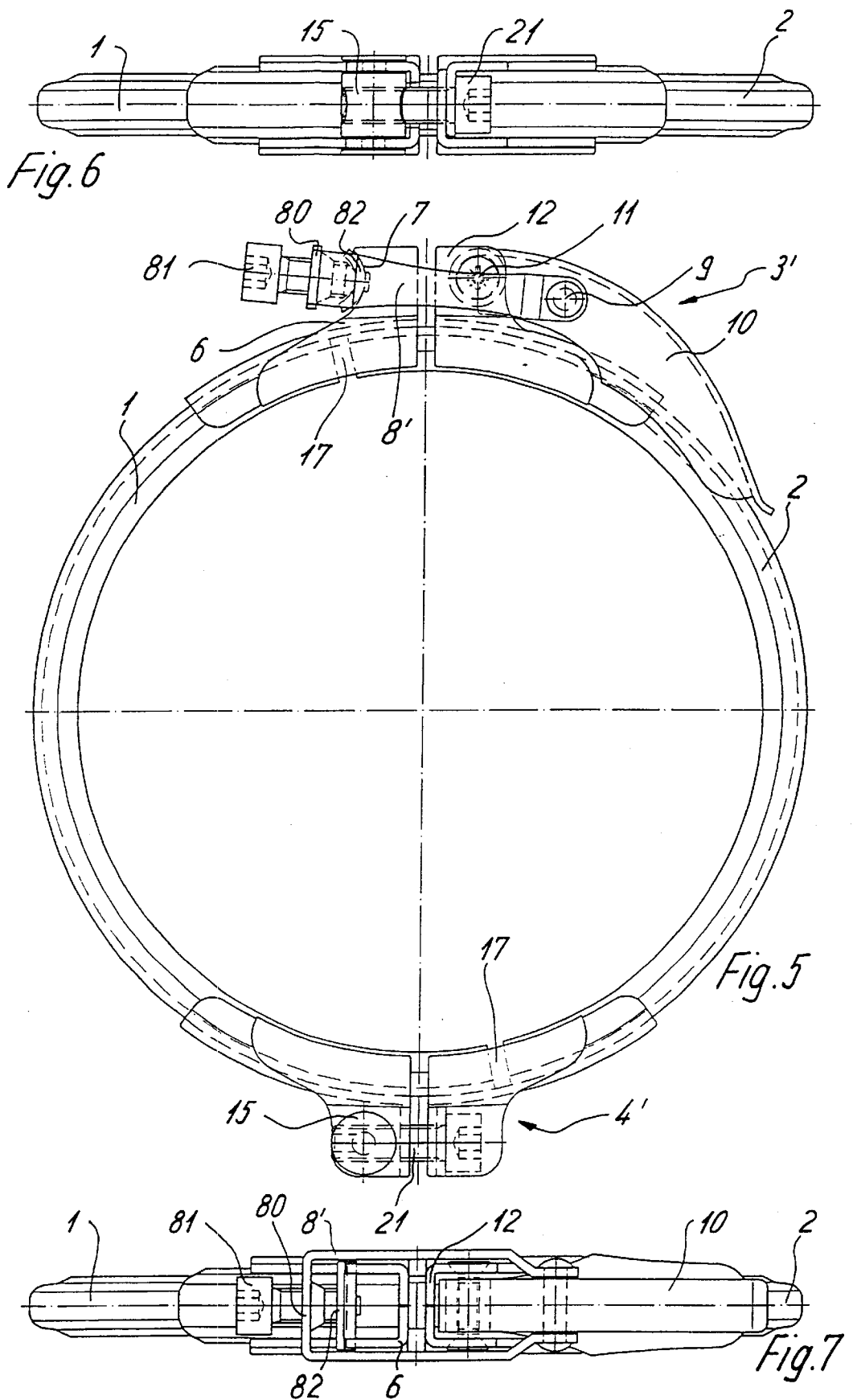

CLAMP RING

BACKGROUND AND SUMMARY OF THE INVENTION

The present invention relates generally to a tension ring, particularly for connecting two tube ends. The tension ring has a ring-shaped receiving device which is formed of several mutually linked segments, and a closing device, by which two segments can be detachably connected with one another.

Tension rings have been suggested which are formed of two segments connected with one another by a hinge and can be braced with respect to one another, on the side situated opposite the hinge, by a closing device. The closing device is a quick-acting closure in which the two segments can be braced with respect to one another by a lever, so that no mounting tool is required. In order to adjust the tension force of the tension ring, an adjusting element, for example, in the form of a screw, is provided on the closing device. The screw can be screwed into a hinge pin of the closing device, so that when the closing device is opened, the adjusting device permits an adjusting of the tension force by adjusting the position of the segments of the tension ring with respect to one another.

Such a tension ring has the disadvantage that the mounting of the tension ring requires relatively high expenditures because the closing device has to be opened and closed again each time for the adjusting of the tension force. The adjusting therefore takes place in steps until the desired tension force occurs. This precise adjustment is therefore relatively laborious, specifically because the adjusting path to be set is usually short. A direct adjustment of the tension ring in the closed condition is usually not intended or is hardly possible because this area is relatively inaccessible.

It is therefore an object of the present invention to provide a tension ring which can easily be mounted as a quick-acting closure and the readjustment or adjustment of the tension force, as required, can also take place subsequently in a simple manner in the closed condition.

This object can be achieved by a tension ring in which the position of the segments relative to one another can be adjusted at least on one hinge element between two segments. By uncoupling the closing mechanism and the adjusting mechanism, the tension ring can easily be tensioned after the mounting. In this case, the tension ring can be adjusted such that, by the closing device, a prefixing/pretensioning is achieved of the tube parts to be connected. Thus, the regulating of the tension can take place without holding the tension ring. This considerably simplifies the mounting because the operations of the mounting of the tension ring at the tube ends and the regulating of the tension can take place in steps which are completely separate from one another. In addition, in the tension-regulated condition, an unauthorized opening of the tension connection is not possible without supplementary devices.

According to a preferred embodiment of the invention, an adjusting movement for the continuous adjustment of two mutually hinged segments is provided so that the adjusting of the tension force can take place in a particularly sensitive manner. In this case, the adjusting device can be formed by a screw which can be screwed into a hinge pin or by other suitable devices.

A simply constructed tension ring with few components has two segments which are mutually connected on one side by the adjustable hinge element and on the opposite side by the closing device.

The closing device preferably has a bow which reaches around a projection provided on a first segment. This type of closing device can be easily mounted because the bow must only be folded over the projection in order to establish a connection between the two segments. For the pretensioning, the bow can be connected in a hinged manner with a lever linked to a second segment, so that the two segments are pulled together as a result of the lever movement.

In order to be able to use the tension ring in a manner which is as flexible as possible, the bow is removably connected to the lever. As a result, in the case of tube ends which are to be connected and which have a deviating diameter or different sealing devices, a suitable bow can be mounted on the tension ring without the requirement of exchanging the remaining elements of the tension ring. In addition to or instead of the exchange of the bow, the lever can be exchanged or have several holes so that the hinge pin of the bow can be mounted in different holes.

According to another embodiment of the invention, the bow is guided in the swivelling direction on a lateral surface of the lever. The bow is connected with the lever by a pin. The guiding of the bow on the lateral surfaces of the lever and/or in a supplementary fashion on the lateral surfaces of the projection ensures a straight swivelling movement, even if the hinge pin is accommodated in the bow with play. When, in addition, the bow rests in a form-locking manner against the projection, the necessary tension force can be made available.

According to another embodiment of the invention, the closing device is provided with a second adjusting device for the subsequent adjustment of the position of two segments relative to one another. As a result, the area between the maximal and minimal receiving diameter of the tension ring can be enlarged, because both adjusting devices supplement one another. In order to be able to produce a second adjusting device at reasonable cost, this adjusting device is preferably formed by a screw which can be screwed into the bow. The bow, or the bow and the lever can subsequently be exchanged for the bow without any adjusting possibility, as required.

Other objects, advantages and novel features of the present invention will become apparent from the following detailed description of the invention when considered in conjunction with the accompanying drawings.

BRIEF DESCRIPTION OF THE DRAWINGS

FIG. 1 is a lateral view of a tension ring of the invention according to a first embodiment;

FIG. 2 is a bottom view of the tension ring of FIG. 1;

FIG. 3 is a top view of the tension ring of FIG. 1;

FIG. 4 is a sectional view along Line x—x of FIG. 1;

FIG. 5 is a lateral view of a tension ring according to a second embodiment of the invention;

FIG. 6 is a bottom view of the tension ring of FIG. 5; and

FIG. 7 is a top view of the tension ring of FIG. 5.

DETAILED DESCRIPTION OF THE PREFERRED EMBODIMENTS

A tension ring illustrated in FIGS. 1 to 4 has a first segment 1 and a second segment 2. The two segments 1 and 2 are connected with one another on one side by a closing device 3 and on the other side by a hinge element 4. The segments 1 and 2 essentially have a U-shaped cross-section (FIG. 4) with legs extending diagonally toward the outside to accommodate two tube flanges with sealing devices (not shown) in the segments 1 and 2. By moving the segments 1 and 2 together, the tube ends are tightly pressed against one another.

In the area of the closing device 3, the segment 1 is surrounded by a profile 5 which is welded to the segment 1. The profile 5 has two projecting lateral walls 6 which have a contact surface 7 for the engagement with a bow 8. At a shaft 9, the bow 8 is connected with a lever 10 in a hinged manner. The lever 10 is linked to a shaft 11 on a projection 12. In the area of the closing device 3, the segment 2 is surrounded by a profile 13 on which the projection 12 is formed. In its front area, the bow 8 has a web 14 which rests against the contact surface 7 on projecting walls 6. The contact point of the bow 8 and surface 7, the shaft 9 and the shaft 11 form a triangle, so that, when the lever 10 is closed, the dead center of the closing device 3 is easily exceeded and the lever 10 is held by the tension forces securely in the closed position. In this case, the lever 10 rests at the end of a grip area 24 against the segment 2.

On the opposite side of the tension ring, a hinge element 4 is provided which connects the segments 1 and 2 with one another in an articulated manner. For this purpose, the segment 1 is continuously connected with a profile 15 on which a projection 18 is constructed. In a similar manner, the segment 2 is surrounded by a profile 16 on which a projection 20 is constructed. In the projection 18, a hinge pin 19 is accommodated and in which is provided with a threaded bore. A screw 21 is screwed into this threaded bore of projection 18. The screw 21, in the area of the head, rests against a wall of the projection 20. Thus, as the result of the screwing-in of the screw 21, a gap 17 between segment 1 and segment 2 at the hinge 4 can be reduced or screwing-out optionally enlarged.

A second embodiment of a tension ring is illustrated in FIGS. 5 to 7, in which components which are identical with those of the first embodiment are provided with the same reference numbers. In the case of this tension ring, a hinge element 41 is provided between the segments 1 and 2. With respect to its function, the hinge element 4' is identical with hinge element 4.

On the opposite side, a closing device 3' is provided in the case of which a bow 8' is connected in a hinged manner by way of a shaft 9 with a lever 10, which in turn is connected at a shaft 11 in an articulated manner with the segment 2. At its end, the bow 8' has a web 80 in which a threaded bore is recessed. A screw 81 is screwed into the threaded bore. The screw 81 carries a rounded disk 82 on its front side. A disk 82 rests against the rounded contact surface 7 of the projection 6. The turning of the screw 81 permits the adjusting of the distance 17 between the segments 1 and 2 or of the tension force after the mounting has taken place.

The shape of the lever 10 is in each case selected such that the segment 2 is surrounded at least partially and, on the whole, represents a visually appropriately shaped component surface which is as rounded as possible.

In the illustrated embodiments, only one opening respectively is provided in the lever 10 for receiving a shaft 9 of the bow 8. It is also possible to recess several openings in the lever 10, so that the bow 8 can be mounted at different points in the lever 10. This enlarges the maximal adjusting range.

The bow 8 and/or the lever 10 is preferably exchangeable so that the tension ring can be flexibly used for different applications.

The tension ring can be made of galvanized steel or of high-grade steel.

The gap 17 between segment 1 and segment 2 is preferably provided in an area in which the segments are surrounded by a profile 5, 13, 15 or 16, so that a lateral fixing of the segment 1 or 2 is achieved by the respective profile and an escaping of the inserted sealing material is prevented.

In the illustrated embodiments, the adjusting of segments 1 and 2 in each case takes place by way of screws having a hexagonal recessed hole. However, it is also possible to provide different screws or adjusting elements, such as turning knobs, detent or clamping connections.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A tension ring for connecting two tube ends, the ring comprising:

several mutually linked segments forming a ring shape;

a closing device detachably connecting two segments;

a hinge element, configured differently from the closing device, between two segments having a pin located such that the two segments are able to freely rotate about the pin without an adjustment of the pin and for all adjustable positions of the pin without an adjustment of the pin and for all same plane as when the segments are in a closed position; and the position of the segments relative to one another is adjustable at least at the hinge element between the two segments hinged together.

2. The tension ring according to claim 1, including an adjusting device for the continuous adjusting of the two segments which are hinged together.

3. The tension ring according to claim 2, wherein the adjusting device includes a screw which can be screwed into a hinge pin of the hinge element.

4. The tension ring according to claim 1, wherein the tension ring has two segments which are mutually connected on one side by the adjustable hinge element and on the opposite side by the closing device.

5. The tension ring according to claim 1, wherein the closing device has a bow mounted on a second segment and which reaches around a projection provided on a first segment.

6. The tension ring according to claim 5, wherein the bow is hinged with a lever linked to a second segment.

7. The tension ring according to claim 6, wherein the bow is removably held on the lever.

8. The tension ring according to claim 6 wherein the bow is guided in the swivelling direction on a lateral surface of the lever and of the projection.

9. The tension ring according to claim 6, wherein the bow together with the lever is removably held on the segment.

10. The tension ring according to claim 9, wherein the bow is swivelably hinged to the lever and the lever is swivelably hinged to the second segment.

11. The tension ring according to claim 6, wherein the lever partially surrounds the second segment such that a straight swiveling movement of the lever is ensured.

12. The tension ring according to claim 1, wherein the closing device includes a second adjusting device for adjusting the position of two segments relative to one another.

13. The tension ring according to claim 12, wherein the second adjusting device includes a screw which can be screwed into a bow of the closing device.

14. The tension ring according to claim 1, wherein lateral fixing of the segments by profiles prevents an escape of inserted sealing material from gap between the segments.

* * * * *